US 6,305,899 B1

United States Patent
Saunders

(10) Patent No.: US 6,305,899 B1
(45) Date of Patent: Oct. 23, 2001

(54) GAS TURBINE ENGINE

(75) Inventor: Duncan Saunders, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/392,301

(22) Filed: Sep. 8, 1999

(30) Foreign Application Priority Data

Sep. 18, 1998 (GB) .................................................. 9820226

(51) Int. Cl.[7] .............................. F01D 21/00; F01D 25/24
(52) U.S. Cl. ............................................. 415/9; 415/214.1
(58) Field of Search ........................... 415/9, 214.1, 189, 415/190, 173.1, 173.4, 173.5, 173.6; 285/363, 368, 405, 412; 403/336, 337

(56) References Cited

U.S. PATENT DOCUMENTS

| | | | |
|---|---|---|---|
| 1,525,647 | * 2/1925 | Haughey | 285/412 |
| 1,819,086 | * 8/1931 | Friend | 285/412 |
| 2,885,768 | * 5/1959 | Shinn | 415/190 |
| 3,387,820 | * 6/1968 | Smith | 415/214.1 |
| 3,490,748 | * 1/1970 | Hoffman | 415/9 |
| 3,529,905 | * 9/1970 | Meginnis | 415/173.4 |
| 3,741,680 | * 6/1973 | Killman et al. | 415/214.1 |
| 3,807,891 | * 4/1974 | McDow et al. | 415/173.1 |
| 4,208,777 | * 6/1980 | Walsh et al. | 415/214.1 |
| 4,684,320 | 8/1987 | Kunz . | |
| 5,096,377 | * 3/1992 | Catte et al. | 415/9 |
| 5,273,396 | * 12/1993 | Albrecht et al. | 415/173.1 |
| 5,314,303 | * 5/1994 | Charbonnel et al. | 415/173.1 |
| 5,462,403 | * 10/1995 | Pannone | 415/173.1 |
| 5,503,490 | 4/1996 | Melton . | |
| 5,520,508 | * 5/1996 | Khalid | 415/173.1 |
| 5,562,408 | * 10/1996 | Proctor et al. | 415/173.1 |

FOREIGN PATENT DOCUMENTS

| | | | |
|---|---|---|---|
| 511690 | * 12/1953 | (BE) | 285/368 |
| 624777 | 6/1949 | (GB) . | |
| 902942 | 8/1962 | (GB) . | |
| 2111129 | * 6/1983 | (GB) | 415/190 |
| 2115487 | 9/1983 | (GB) . | |
| 2260786 | 4/1993 | (GB) . | |
| 52-68611 | * 6/1977 | (JP) | 415/189 |

OTHER PUBLICATIONS

British Search Report for GB 9820226.0, Dated May 26, 1999.*

* cited by examiner

Primary Examiner—Christopher Verdier
(74) Attorney, Agent, or Firm—W. Warren Taltavull; Manelli Denison & Selter PLLC

(57) ABSTRACT

A gas turbine engine core casing comprises axially adjacent portions (20,21) that are flanged to receive bolts (28) that attach the portions (20,21) to each other. One of the casing portions (20) is provided with flange (23) that is of L-shape cross-section to provide local enhancement of the rigidity of the casing portion (20). Such rigidity enhancement provides improved debris containment in the event of the failure of rotor components within the casing.

6 Claims, 1 Drawing Sheet

Fig. 1.
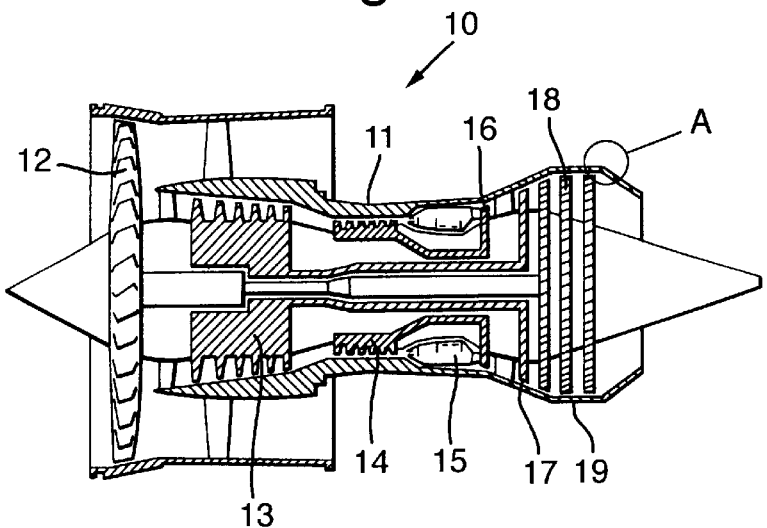
Fig. 2. Fig. 3.
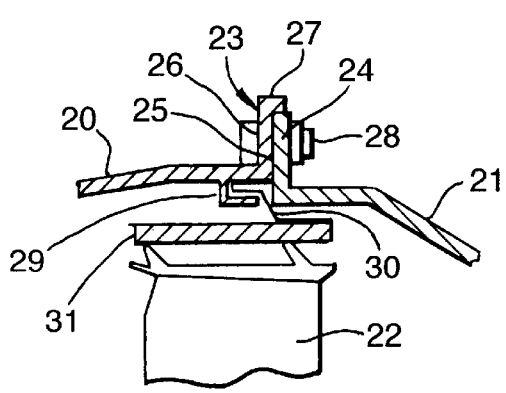 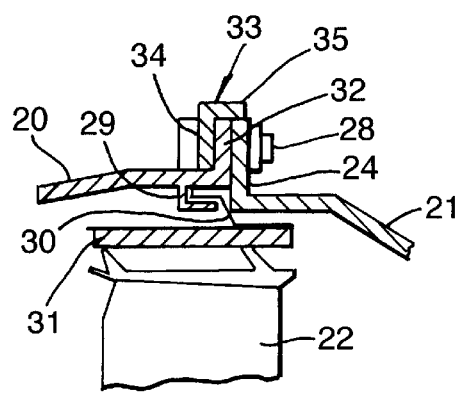
Fig. 4.
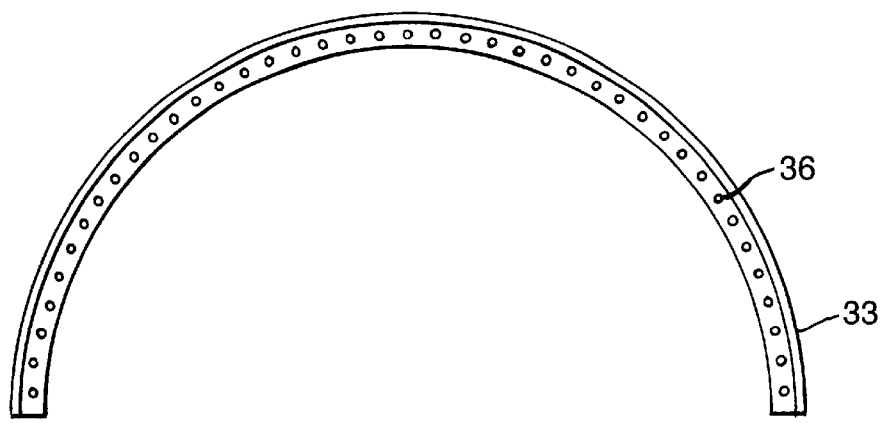

GAS TURBINE ENGINE

THE FIELD OF THE INVENTION

This invention relates to gas turbine engine and is particularly concerned with the manner in which at least some of the constituent parts of a casing of such an engine are joined to each other.

BACKGROUND OF THE INVENTION

The core of a modern axial flow gas turbine engine is typically enclosed by a casing that comprises a number of coaxial annular cross-section portions that are connected in series. Conventionally, each of the casing portions is provided with a radially outwardly extending annular flange at each of its axial extents. The flanges of adjacent casing portions are maintained in engagement with each other by bolts that extend through suitably located and aligned holes is in the flanges.

In the compressor and turbine sections of such an engine, annular arrays of rotor blades are contained within the casing. During engine operation, these rotor blade arrays rotate at very high speeds. If any of the rotor blades should suffer a structural failure, they travel at high speed in a generally radially outward direction to impact the casing section adjacent thereto. In the interests of safety, the casing must be sufficiently strong to contain such failed blades. However, this is a more difficult task if the failed blades are located adjacent the previously mentioned flanges joining adjacent two casing portions. If one of the casing portions is less rigid than the other, there can be a tendency for that casing portion to be radially deflected to a greater extent than the other. This brings about the imposition of shear loads upon some of the bolts joining the casing portions and their eventual failure. High pressure gases normally present within the casing then tend to urge the flanges apart, so in turn exerting tensile loads upon the remaining bolts and in some cases, causing their failure also.

If adjacent casing section flanges are urged apart in this manner, there is, of course, an increased likelihood of the non-containment by the casing of failed rotor blades and associated debris.

One way in which this problem could be tackled is by the strengthening of one of the casing portions so that its rigidity is increased to a level similar to that of the casing portion adjacent thereto. However, this results in a significant increase in the weight of the casing portion which is a undesirable feature in aircraft-mounted gas turbine engines.

SUMMARY OF THE INVENTION

It is an object of the present invention to provide a gas turbine engine casing portion having enhanced rigidity with a minimal weight penalty.

According to the present invention, a gas turbine engine includes a casing enclosing a rotary stage of aerofoil blades, said casing comprising two axially adjacent annular cross-section portions, one of which is provided with a flange located at one of its axial extents for connection to a corresponding flange provided on the other casing portion, one of said flanges being of generally L-shaped cross-section in a circumferential direction so as to comprise radially outwardly and axially extending portions and the other being generally radially outwardly extending, said radially outwardly extending portions of said flanges axially abutting each other and said axially extending portion of said L-shape flange locating adjacent and radially outwardly of the radial extent of said other flange, said radially outwardly extending axially abutting flange portions being positioned radially outwardly of and in radial alignment with said rotary stage of aerofoil blades.

The whole of said generally L-shaped cross-section flange may be integral with said casing portion.

Alternatively, said flange comprises a part that is integral with said casing portion and a part that is mechanically attached to said integral part.

Said part mechanically attached to said integral part is preferably a ring of substantially L-shaped cross-section configuration.

Said ring may be divided into two semicircular parts.

Said ring and said integral part may be attached to each other by bolts, said ring and integral part having apertures to receive said bolts.

BRIEF DESCRIPTION OF THE DRAWINGS

The present invention will now be described, by way of example, with reference to the accompanying drawings in which:

FIG. 1 is a schematic sectioned side view of a ducted fan gas turbine engine incorporating a casing portion in accordance with the present invention.

FIG. 2 is a sectioned side view of a part of the casing of the ducted fan gas turbine engine shown in FIG. 1 showing a casing portion in accordance with the present invention.

FIG. 3 is a view similar to that shown in FIG. 2 and showing an alternative embodiment of the present invention.

FIG. 4 is a view of a further embodiment of the present invention.

DETAILED DESCRIPTION OF THE INVENTION

With reference to FIG. 1, a ducted fan gas turbine engine generally indicated at 10 is of conventional configuration comprising a core engine 11 that drives a ducted fan 12.

The core engine 11 comprises, in axial flow series, an intermediate pressure compressor 13, high pressure compressor 14, combustion equipment 15, and high, intermediate and low pressure turbines 16, 17 and 18 respectively. The intermediate and high pressure compressors 13 and 14 and the high, intermediate and low pressure turbines 16, 17 and 18 comprise rotor portions that are enclosed within a casing 19.

In the interests of ease of construction, the casing 19 is not a single piece component but is instead made up of a number of axially adjacent, annular cross-section portions that are attached to each other by bolts. Two of those casing portions enclose part of the low pressure turbine 18.

Part of the joint between those two casing portions can be seen if reference is now made to FIG. 2 which is a view, on an enlarged scale, of the area designated by the letter "A" in FIG. 1. The axially adjacent first and second casing portions 20 and 21 are attached to each other radially outwardly of an annular array of rotor aerofoil blades 22, one of which can be seen in FIG. 2.

The first casing portion 20, which encloses the major part of the low pressure turbine 18, is provided with an annular flange 23 at its downstream end to facilitate its attachment to an annular flange 24 provided at the upstream end of the second casing portion 21. Throughout this specification, the terms "upstream" and "downstream" are used with respect to the general direction of gas flow through the core engine 11.

The flange 24 on the second casing portion 21 is of conventional configuration. It is radially outwardly extending so as to define an upstream facing annular face 25. However, the flange 23 on the first casing portion 20 is of generally L-shape cross-sectional configuration in a circumferential direction. More specifically, it comprises a radially outwardly extending portion 26 and an axially extending portion 27.

The radially outwardly extending flange portion 26 axially abuts the upstream facing annular face 25 of the flange 24 on the second casing portion 21. Aligned holes are provided in the flanges 23 and 24 to receive bolts 28 which serve to maintain the flanges 23 and 24 in engagement with each other. The bolts 28 are equally spaced around the flanges 23 and 24 so as to ensure a gas tight seal therebetween and an appropriate number of holes is provided in the flanges 23 and 24 to receive those bolts 28.

The axially extending flange portion 27 is positioned on the radially outer extent of the radially outwardly extending flange portion 26 and extends in a downstream direction, radially outwardly of the flange 24. A small radial gap is provided between the axially extending flange portion 27 and the flange 24.

The radially inner surface of the first casing portion 20 adjacent the flange 23 is provided with a further annular L-shaped cross section flange 29. The further flange 29 is open in the downstream direction to receive an annular support structure 30. The support structure 30 serves to support an annular shroud 31 in a position radially inwardly of both of the first and second casing portions 20 and 21. The annular shroud 31 co-operates with the annular array of rotor aerofoil blades 22 to limited the leakage of gases past those turbine blades 22 in the conventional manner.

In the unlikely event of the failure of one or more of the rotor aerofoil blades 22, the resultant debris will be thrown in a radially outward direction to impact the first and second casing portions 20 and 21. The first casing portion 20 is generally less rigid than the second casing portion 21. This is due to the first casing portion 20 not being exposed to the same magnitude of loads as those to which the second casing portion 21 is exposed. This would normally lead to the first casing portion 20 distorting more readily when impacted by aerofoil blade 22 portions. This, in turn, would lead to shear loads being imposed upon bolts 28 local to the position of casing distortion and the subsequent failure of those bolts 28 in shear.

In accordance with the present invention, the L-shape cross-section configuration of the flange 23 on the first casing portion 20 ensures that the rigidity or stiffness of the first casing portion 20 in the region of the flange 23 is enhanced. Indeed, it is enhanced to the extent that in the region of the interface between the flanges 23 and 24, the casing portions 20 and 21 are of similar rigidity. This ensures that in the event of debris impact, the casing portions 20 and 21 in the region of the flanges 23 and 24 distort in a similar manner. Consequently, the shear loads imposed upon the bolts 28 are reduced, thereby decreasing the likelihood of those bolts 28 failing in shear.

The axially extending flange portion 27, as well as enhancing casing rigidity, additionally serves to constrain any tendency for the flange 24 on the second casing portion 21 to move in a radially outward direction relative to the first casing portion 20. Moreover, in the event of some of the bolts 28 failing in tension, the axially extending flange portion 27 provides a certain degree of containment of debris that could escape through the resultant axial gap between the flanges 23 and 24.

Although in the embodiment of the present invention described above, the whole of the flange 23 on the first casing portion 20 is an integral part of that casing portion, this is not essential. In an alternative embodiment of the present invention shown in FIG. 3, in which features corresponding with those of the embodiment of FIG. 2 share common reference numerals, a different flange construction is utilised.

Referring to FIG. 3, the first casing portion 20 is provided with a flange 32 that is of conventional configuration, corresponding in form to the flange 24 on the second casing portion 21. However, the bolts 28 additionally serve to retain an L-shaped cross-section ring 33 adjacent the first casing portion flange 32. The ring 33 is made up of two parts that are perpendicular to each other, the first part 34 being generally radially extending and the second part 35 generally axially extending. The radially extending ring part 34 abuts the flange 32 on the first casing portion 20. A plurality of apertures in the ring part 34 receive the bolts 28 so that the bolts 28 maintain the flange 32 and the ring part 34 in engagement with each other.

The axially extending ring portion 35 extends over the radially outer extents of the flanges 32 and 24 in a similar manner to the flange 23 in the embodiment of FIG. 2. It will be seen, therefore, that the ring 33 serves to increase the rigidity of the casing portion 20 in the region of the flange 32 in the same manner as occurs in the previously described embodiment. However, since the ring 33 is a separate component, it may be utilised in modifying the rigidity of an existing casing. Thus the expense of producing a new casing design is avoided if enhanced casing rigidity is required.

If the ring 33 is utilised in the modification of the rigidity of an existing casing portion 20, it may be inconvenient to fit. Under such circumstances, the ring 33 may be divided into several pieces. However, preferably it is divided into two similar semicircular pieces, one of which is shown in FIG. 4. The view of the portion of the ring 33 in FIG. 4 also shows the positioning of holes 36 to receive the bolts 28. The holes are, of course, aligned with the previously mentioned corresponding holes (not shown) provided in the flanges 32 and 24.

It will be seen, therefore, that the present invention provides a modification of the casing portion 20 to enhance its rigidity locally. As a result, the casing portion 20 may be constructed in such a manner that it is of optimal strength, weight and rigidity.

Although the present invention has been described with reference to part of the turbine casing of a gas turbine engine, it will be appreciated that it could be applied to other parts of the core engine casing of a gas turbine engine that surround rotor aerofoil blades.

What is claimed is:

1. A gas turbine engine including a casing enclosing a rotary stage of aerofoil blades, said casing comprising two axially adjacent annular cross-section casing portions, one of which is provided with a flange located at one of its axial extents for connection to a corresponding flange provided on the other casing portion, one of said flanges being of generally L-shaped cross-section in a circumferential direction so as to comprise radially outwardly and axially extending portions and the other being generally radially outwardly extending, said radially outwardly extending portions of said flanges axially abutting each other and said axially extending portion of said L-shaped flange locating adjacent and radially outwardly of the radial extent of said other flange, said radially outwardly extending axially abutting flange portions being positioned radially outwardly of and in radial alignment with said rotary stage of aerofoil blades, said one of said flanges being formed so that the rigidity of its said annular casing portion matches the rigidity of the other of said two axially adjacent annular cross-section portions.

2. A gas turbine engine as claimed in claim 1 wherein the whole of said generally L-shaped cross-section flange is integral with its associated casing portion.

3. A gas turbine engine as claimed in claim 2 wherein said generally L-shaped flange comprises a part that is integral with said casing and a part that is mechanically attached to said integral part.

4. A gas turbine engine as claimed in claim 3 wherein said part mechanically attached to said integral part is a ring of substantially L-shaped cross-section configuration.

5. A gas turbine engine as claimed in claim 4 wherein said ring is divided into two semicircular parts.

6. A gas turbine engine as claimed in claim 4 wherein said ring and said integral part are attached to each other by bolts, said ring and said integral part having apertures to receive said bolts.

* * * * *